US012559350B2

(12) United States Patent
Stocker

(10) Patent No.: US 12,559,350 B2
(45) Date of Patent: Feb. 24, 2026

(54) METHOD AND DEVICE FOR CONTROLLING A CLOSING MOVEMENT OF A DOOR OF AN ELEVATOR CAR IN THE EVENT OF A POWER FAILURE, METHOD FOR RETROFITTING A DOOR OF AN ELEVATOR CAR, DOOR FOR AN ELEVATOR CAR, AND ELEVATOR SYSTEM

(71) Applicant: Inventio AG, Hergiswil (CH)

(72) Inventor: Hansueli Stocker, Immensee (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/866,579

(22) PCT Filed: May 9, 2023

(86) PCT No.: PCT/EP2023/062192
§ 371 (c)(1),
(2) Date: Nov. 18, 2024

(87) PCT Pub. No.: WO2023/227359
PCT Pub. Date: Nov. 30, 2023

(65) Prior Publication Data

US 2025/0340404 A1 Nov. 6, 2025

(30) Foreign Application Priority Data

May 24, 2022 (EP) .................................... 22175123

(51) Int. Cl.
*B66B 13/14* (2006.01)
*B66B 13/24* (2006.01)
*B66B 19/00* (2006.01)

(52) U.S. Cl.
CPC .......... *B66B 13/146* (2013.01); *B66B 13/245* (2013.01); *B66B 19/007* (2013.01)

(58) Field of Classification Search
CPC .... B66B 13/143; B66B 13/245; B66B 13/146
See application file for complete search history.

(56) References Cited

U.S. PATENT DOCUMENTS 4,436,184 A * 3/1984 Dorman .................. B66B 13/08 187/331
4,529,065 A * 7/1985 Kraft ....................... B66B 13/08 187/314

(Continued)

FOREIGN PATENT DOCUMENTS

CN 113165843 B * 9/2023 ........... B66B 13/143
DE 19811338 A1 * 9/1999 ................ E05F 1/16

(Continued)

*Primary Examiner* — Michael A Riegelman
(74) *Attorney, Agent, or Firm* — Shumaker, Loop & Kendrick, LLP

(57) ABSTRACT

A method for controlling a closing movement of a door of an elevator car in the event of a power failure uses the door drive and an electrical energy store. During normal operation of the door by the door drive, electrical energy is buffered in the energy store. In response to a power failure when the door is open, a closing mechanism begins to close the door and the stored electrical energy is provided as backup energy to the door drive by a control device to decelerate the closing movement.

14 Claims, 1 Drawing Sheet

(56) References Cited

U.S. PATENT DOCUMENTS

| | | | | |
|---|---|---|---|---|
| 5,347,755 | A * | 9/1994 | Jaster | E05F 17/004 49/118 |
| 6,633,094 | B1 * | 10/2003 | Andou | E05F 5/003 49/228 |
| 7,178,638 | B2 * | 2/2007 | Fujita | B66B 13/24 187/334 |
| 7,246,688 | B2 * | 7/2007 | Tonna | E05F 15/635 187/324 |
| 9,567,190 | B2 * | 2/2017 | Sax | B66B 13/143 |
| 9,586,790 | B2 | 3/2017 | Tyni et al. | |
| 10,343,664 | B2 | 7/2019 | Roberts | |
| 11,192,752 | B2 | 12/2021 | Camenzind et al. | |
| 11,279,595 | B2 * | 3/2022 | Raassina | B66B 13/24 |
| 2006/0175143 | A1 * | 8/2006 | Fujita | B66B 13/24 187/314 |
| 2015/0284216 | A1 * | 10/2015 | Sax | E05F 15/72 318/368 |
| 2021/0292129 | A1 | 9/2021 | Harada | |
| 2022/0017334 | A1 * | 1/2022 | Stocker | E05F 15/40 |

FOREIGN PATENT DOCUMENTS

| | | | | |
|---|---|---|---|---|
| DE | 102004060282 | A1 * | 6/2006 | E05F 15/72 |
| FR | 2968698 | A1 * | 6/2012 | E05F 15/72 |
| GB | 2257540 | B | 1/1993 | |
| JP | H0459587 | A | 2/1992 | |
| JP | H1121052 | A | 1/1999 | |
| WO | 2012087373 | A1 | 6/2012 | |
| WO | 2013038060 | A1 | 3/2013 | |
| WO | 2019063406 | A1 | 4/2019 | |
| WO | 2020157367 | A1 | 8/2020 | |
| WO | 2021099672 | A1 | 5/2021 | |
| WO | 2021121905 | A1 | 6/2021 | |

* cited by examiner

Fig. 1
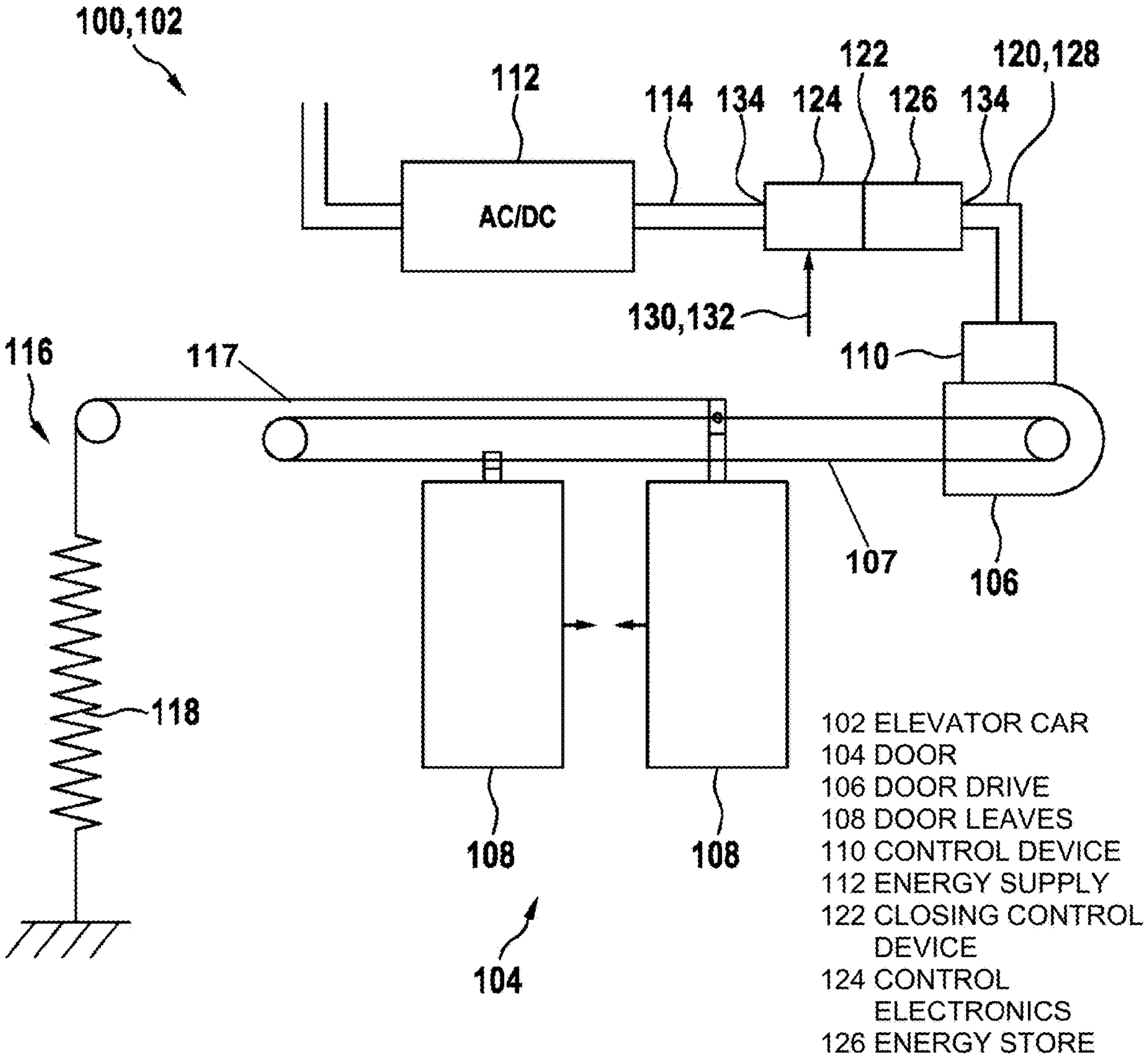
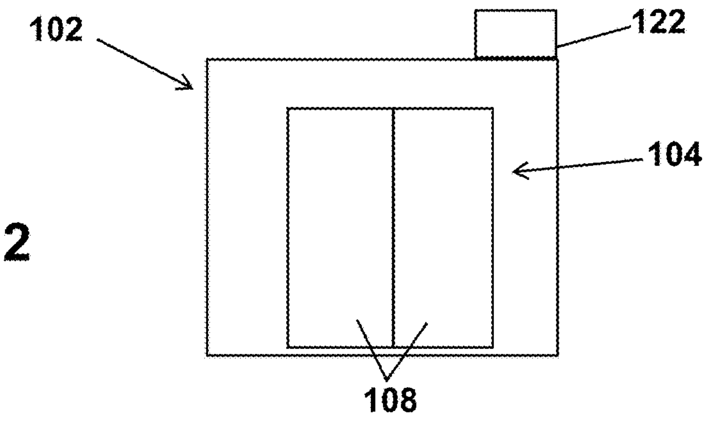
Fig. 2

METHOD AND DEVICE FOR CONTROLLING A CLOSING MOVEMENT OF A DOOR OF AN ELEVATOR CAR IN THE EVENT OF A POWER FAILURE, METHOD FOR RETROFITTING A DOOR OF AN ELEVATOR CAR, DOOR FOR AN ELEVATOR CAR, AND ELEVATOR SYSTEM

FIELD

The present invention relates to a method for controlling a closing movement of a door of an elevator car in the event of a power failure, a corresponding device, a method for retrofitting a door of an elevator car, a door for an elevator car and an elevator system.

BACKGROUND

An elevator system can have doors that close without power. For this purpose, each door can have a mechanical energy storage device that is released in the event of a power failure and closes the door. For example, a mechanism is provided on the elevator door, which has, for example, a pre-tensioned spring or a tensioning weight and is designed to close the elevator door automatically as soon as it is no longer actively powered by an actuator powered during normal operation and is thus held open.

Closing can take place without braking. The door can accelerate sharply and hit a door stop. This can result in a high development of noise.

To avoid the noise development, the door can be equipped with a friction brake. This component not used in normal operation causes additional costs. Alternatively, a drive motor of the door can be used as a dynamic brake in the event of a power failure by permanently connecting the drive motor as a generator during the power failure. This requires a special design of the drive motor.

For example, US 2021/292129 A1 describes a control device for an elevator door. JP H0459587 A describes a door drive that controls the closing movement using a built-in battery. JP H1121052 A shows a door drive that decelerates the door movement in the event of a power failure and reopens the door.

SUMMARY

There can be a need, among other things, for an improved method for controlling a closing movement of a door of an elevator car in the event of a power failure. Furthermore, there can be a need for an improved device that can be used as part of such a method.

Such a need can be met by a method and a device according to the advantageous embodiments defined in and described in the description.

In the approach presented here, a door drive of an elevator car is used to brake a closing movement of a door of the elevator car. The braking performance of the door drive is controlled when the door is closed without power in order to bring the door gently to a stop. For this purpose, an electrical buffer storage with control electronics is connected between an energy supply of a control device of the door drive and the control device. The buffer storage is charged as long as the energy supply is functioning. If the energy supply fails due to a power failure, the buffered energy is released in a controlled manner by the control electronics to the control device in order to use the door drive as a dynamic brake. The control device of the door drive is configured in such a way that if the energy supply fails, the door drive can rotate substantially freely, and once the energy supply is restored, the door drive is blocked.

Using the approach presented here, a door drive of an elevator door can be used cost-effectively and easily as a controllable dynamic brake. The device presented here can generally be retrofitted without any further adaptation measures.

In accordance with a first aspect of the invention, a method for controlling a closing movement of a door of an elevator car in the event of a power failure is presented, wherein, during normal operation of the door, electrical energy is buffered and, in response to the power failure, the energy is provided as backup energy to a control device of the door in order to decelerate the closing movement.

In accordance with a second aspect of the invention, a device for controlling a closing movement of at least one door of an elevator car in the event of a power failure is presented, wherein the device is designed to carry out, implement, and/or control the method in accordance with the first aspect of the invention in corresponding devices.

In accordance with a third aspect of the invention, a method for retrofitting a door of an elevator car is presented, wherein a device in accordance with the second aspect of the invention is looped into an energy line between an energy supply of the control device and the control device.

In accordance with a fourth aspect of the invention, a door for an elevator car is presented, wherein the door has a mechanical closing mechanism for closing the door in the event of a power failure, wherein a device in accordance with the second aspect of the invention is looped into an energy line between an energy supply of the control device and the control device and buffers the electrical energy from the energy supply during normal operation.

In accordance with a fifth aspect of the invention, an elevator system with at least one door in accordance with the fourth aspect of the invention is presented.

An elevator system can be a passenger transport system. The elevator system can have at least one elevator car with at least one door. In particular, the door can be a sliding door. The door can be opened and closed by a door drive in a motorized manner. As long as the door drive is supplied with electrical energy, the door drive can exert force on the door and open, close, or hold the door. In the event of a power failure, the door drive can no longer hold or move the door without power. The door, which is thus not braked, can be closed using a closing mechanism. The closing mechanism can have a mechanical energy store. The energy store can, for example, be a pre-tensioned spring and/or a wound-up weight. The spring can be tensioned during an opening movement of the door. The weight can be pulled upward during the opening movement. The energy stored in the energy store drives a one-time closing movement of the door. After the closing movement, the amount of energy stored in the energy store is substantially used up.

The door drive is operated by a control device. The control device is supplied with electrical energy from an energy supply. The energy supply provides a supply voltage. The supply voltage can in particular be a low voltage, such as 24 volts direct current. The control device energizes the door drive using the supply voltage to operate the door.

In the approach presented here, the supply voltage for the control device is buffered in an electrical energy store of an intermediate device in accordance with the second aspect of the invention. The electrical energy store can, for example, be a battery and/or a capacitor. If the power fails and the supply voltage is consequently interrupted, the buffered electrical energy is released in a controlled manner by the control electronics of the device. The buffered energy can be provided as backup energy for the supply voltage of the control device. This allows the control device to continue powering the door drive, and the door drive can control the closing movement driven by the closing mechanism.

The backup energy is provided intermittently, i.e., the backup energy can be provided with interruptions over time. In other words, the backup energy cannot be provided continuously. During the interruptions, the door can be accelerated by the closing mechanism. While the backup energy is being provided, the door can be braked. This allows the door to close in stages or step by step. During an interruption, the door can be accelerated to a low speed in response to the force exerted by the closing mechanism. When the backup energy is provided, the low speed can be braked again.

The backup energy can be provided after the power failure with a delay of a predefined duration. By delaying the provision of backup energy, the door can be accelerated by the closing mechanism to begin the closing movement. After the delay duration, the backup energy is provided and the door is braked. The delay duration can depend on the design of the door, the closing mechanism, and/or the door drive. For example, the delay duration can be shorter than 5 s, shorter than 2 s, shorter than 1 s or shorter than 0.5 s. The delay duration can be parameterized, for example, when starting up the elevator system or when retrofitting the device.

Alternatively or additionally, the backup energy can be provided when the start of the closing movement is detected. The closing movement can be detected by a sensor. A signal from the sensor can be evaluated. The start of the closing movement can be detected when the door has covered a minimum distance or has reached a minimum speed.

The provision can be paused after a predefined provision duration. During a provision duration, the door can be braked by the door drive to a desired target speed. During the provision duration, the door can also be braked to a stop. After the provision duration, the door can be accelerated again by the closing mechanism. The provision duration can depend on the control device. The provision duration can depend on the duration of a boot process of the control device. The control device can short-circuit coils of the door drive during the boot process. By short-circuiting, the closing movement can be braked. The provision duration can also depend on the mass of the door. The provision duration can be parameterized, for example, when starting up the elevator system or when retrofitting the device.

Alternatively or additionally, provisioning can be interrupted if braking is detected. The closing movement can be detected by a sensor. A signal from the sensor can be evaluated. Braking can be detected when the door is slower than a target speed.

Alternatively, provisioning can be interrupted if a start-up of the control device is detected. The control device can send its status as a data signal. Once the boot process is complete, the backup energy can be interrupted again.

After the interruption, the backup energy can be provided again with a predefined delay duration. During the delay duration, the closing movement can restart. With the delay duration, a new cycle of accelerating the door again and then decelerating the door again can begin. The predefined delay duration and the predefined provision duration allow the closing movement to be controlled without data exchange between the device and the control device.

The backup energy can be provided until the buffered energy is used up. The provision and interruption can continue until the energy store is empty. The provision and interruption can also take place when the door is closed.

The device can comprise connectors for looping the device into an energy line between the energy supply of the control device and the control device. The connectors can be designed as matching plugs and sockets. The device can be easily inserted into an existing separation point between the energy supply and the control device using the connectors. Retrofitting is therefore particularly easy.

It should be noted that some of the possible features and advantages of the invention are described herein with reference to different embodiments of methods on the one hand and of devices on the other. A person skilled in the art will recognize that the features can be suitably combined, adapted, or exchanged in order to arrive at further embodiments of the invention.

Embodiments of the invention will be described below with reference to the accompanying drawing, wherein neither the drawing nor the description are intended to be interpreted as limiting the invention.

DESCRIPTION OF THE DRAWINGS

FIG. 1 is a representation of an elevator system in accordance with an embodiment of the invention.

FIG. 2 is a front elevation view of the elevator car of the elevator system shown in FIG. 1.

The drawings are merely schematic and not to scale. The same reference signs indicate the same or equivalent features.

DETAILED DESCRIPTION

FIG. 1 is a representation of an elevator system 100 in accordance with an embodiment of the invention. The elevator system 100 has at least one elevator car 102. The elevator car 102 has a door 104 (FIG. 2). The door 104 is driven by a door drive 106. The door drive 106 acts on the door 104 via a cable or belt 107. The door 104 in this case has two opposing door leaves 108. The cable or belt moves the door leaves 108 in this case in opposite directions.

The door drive 106 is controlled via a control device 110. The control device 110 is supplied with a supply voltage 114 by an energy supply 112 or a power supply. The energy supply 112 converts alternating current from a power grid into direct current with a low voltage in order to generate the supply voltage 114. The supply voltage 114 is, for example, 24 volts.

The control device 110 energizes the door drive 106 using the supply voltage 114. As long as the door drive 106 is energized, it can move or hold the door 104. When the door drive 106 is without power, it can no longer exert any force on the door 104.

In the event of a power failure, the door 104 has a closing mechanism 116. The closing mechanism 116 is coupled to the door 104 and the door drive 106 via the cable or belt 117. The closing mechanism 116 has a mechanical energy store 118. In the energy store 118, mechanical energy is stored for closing the door 104 once in the event of a power failure. The energy store 118 is designed in this case as a spring, but can also be designed as a weight. The energy store 118 is charged or tensioned by the door drive 106 with each opening movement of the door 104 and is discharged or relaxed with each closing movement, and thereby supports the door drive 106. If the door 104 is open and the door drive 106 can no longer exert force on the door 104 due to the power failure, the mechanical energy stored in the energy store 118 pulls the door 104 closed with a closing movement.

In the approach presented here, a device 122 for controlling the closing movement of the door 104 in the event of a power failure is looped into an energy line 120 between the energy supply 112 and the control device 110. The device 122 has control electronics 124 and an electrical energy store 126. The energy store 126 can be designed, for example, as an accumulator and/or capacitor.

In the energy store 126, electrical energy is buffered during normal operation of the elevator system 100. During normal operation, the energy store 126 is therefore charged with the supply voltage 114 by the control electronics 124. During a power failure, the control electronics 124 provides the stored energy as backup energy 128 for the control device 110.

In one embodiment, the backup energy 128 is provided in pulses during the power failure, for example with current pulses periodically transmitted to the control device 110. While the backup energy 128 is provided, the control device 110 energizes the door drive 106, and the door drive 106 counteracts the closing movement driven by the closing mechanism 116. The closing movement is thereby braked or stopped. If the backup energy 128 is interrupted, the door drive 106 is no longer powered by the control device 110. As a result, the door drive 106 can no longer counteract the force of the closing mechanism 116, and the closing movement is again driven by the closing mechanism 116. Subsequently, backup energy 128 is provided again, and the closing movement is braked again. By a repeated sequence of providing the backup energy 128 and switching off the backup energy 128, the closing movement can be jerky or in pulses. The average speed of the closing movement can thus be significantly reduced.

In one embodiment, the backup energy 128 is not provided immediately after the power failure. Upon first providing backup energy, a predefined waiting time or delay duration 130 is waited. During the delay duration 130, the closing movement can begin. After the delay duration 130, the backup energy 128 is provided, and the control device 110 can power the door drive 106, whereby the closing movement is braked again.

In one embodiment, the provision of the backup energy 128 is interrupted after a predefined provision duration 132. During the provision duration 132, the backup energy 128 is provided. The provision duration 132 is long enough for the door drive 106 to brake the closing movement.

In one embodiment, the provision duration 132 depends on an initialization period of the control device 110. The control device 110 requires a moment after receiving the backup energy 128 until the door drive 106 is energized. The provision duration 132 can be longer than the initialization period so that the braking effect of the door drive 106 can develop.

In one embodiment, the delay duration 130 and the provision duration 132 are dependent on a size or mass of the door 104 and a strength of the closing mechanism 116. The provision duration 132 is also dependent on a braking performance of the door drive 106. The delay duration 130 and the provision duration 132 can be different for different elevator systems 100. If the device 122 is retrofitted, the delay duration 130 and the provision duration 132 can be parameterized during the retrofit.

In one embodiment, after the interruption of the provision, the delay duration 130 is again waited until the backup energy 128 is provided again. This alternation between providing and not providing can continue until the energy buffered in the electrical energy store 126 is used up. This can be done independently of the position of the door 104.

The provision and interruption can also be controlled. In particular, movement of the door can be detected and evaluated by sensors. The backup energy 128 can be provided, for example, when the start of the closing movement is detected. The provision can be interrupted if the braking of the closing movement is detected.

The provision can also be interrupted if the initialization or start-up of the control device 110 is signaled.

In one embodiment, the device 122 has connectors 134 via which the device 122 is looped into the energy line 120. The device 122 is independent of the door 104 and only monitors the supply voltage 114. After the supply voltage 114 stops, the buffered energy is provided as the backup energy 128. Due to the connectors 134, the device 122 can be particularly easily retrofitted to existing elevator systems 100.

In the following, possible embodiments of the invention are summarized again or presented using slightly different wording.

A device for installation in an elevator door, an elevator door, an elevator, a method for retrofitting an elevator and a method for slowly closing a door in the event of a power failure are presented.

Elevator doors have a mechanism that serves to close the door without the effect of additional force. These are usually springs or tensioning weights. If a power failure occurs when the door is open, a door drive no longer provides the force to keep the door open, and the door closes very quickly. This causes a loud bang and can damage the door.

The approach presented here causes the door to close slowly if a power failure occurs while the door is open. For this purpose, a device is looped into the power supply of the door drive.

If the power supply is intact, this simply passes the 24 V DC on to the door drive and simultaneously charges a capacitor or a battery.

In the event of a power failure, the door drive is alternately supplied with 24 V for a short time and then disconnected from the 24 V again.

The slow closing is achieved by the door drive booting as soon as it is supplied with power and then short-circuiting the coils of the motor. This blocks the drive. When the power supply drops again, the motor is released again. The door can always close a little bit and then stop again. As a result, it closes with less energy at the end. The device can continue to operate undisturbed even after it has been closed.

The device can be easily retrofitted since no part of the elevator needs to be adapted to this device. In regions that often have power failure, the device can be installed from the start without having to adapt the other components to the presence of the device.

Finally, it should be noted that terms such as "having," "comprising," etc., do not preclude other elements or steps, and terms such as "a" or "one" do not preclude a plurality. Furthermore, it should be noted that features or steps which have been described with reference to one of the above exemplary embodiments may also be used in combination with other features or steps of other exemplary embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for controlling a closing movement of a door of an elevator car in response to a power failure of a door drive acting on the door, the method comprising steps of:
- buffering electrical energy during a normal operation of the door by the door drive;
- in response to a power failure of the door drive, providing the buffered energy as backup energy to a door control device to operate the door drive and brake a closing movement of the door; and
- providing the backup energy intermittently to the door control device.

2. The method according to claim 1 including providing the backup energy with a delay of a predefined delay duration after the power failure occurs.

3. The method according to claim 1 including providing the backup energy when a start of the closing movement is detected.

4. The method according to claim 1 including interrupting the providing of the backup energy after a predefined provision duration.

5. The method according to claim 1 including interrupting the providing of the backup energy in response to detecting the braking of the closing movement.

6. The method according to claim 1 including interrupting the providing of the backup energy in response to detecting a start-up of the door control device.

7. The method according to claim 1 including interrupting the providing of the backup energy and resuming the providing after the interruption with a delay of a predefined delay duration.

8. The method according to claim 1 including providing the backup energy until the buffered energy is consumed.

9. A closing control device for controlling a closing movement of a door of an elevator car in response to a power failure of a door drive acting on the door, the closing control device being adapted to control the door drive using the method according to claim 1.

10. The closing control device according to claim 9 including connectors adapted to loop the closing control device into an energy line between an energy supply of the door control device and the door control device.

11. A method for retrofitting a door of an elevator car, the method comprising steps of:
- providing the closing control device according to claim 9; and
- looping the closing control device into an energy line between an energy supply of the door control device and the door control device.

12. A door for an elevator car, the door comprising:
- a mechanical closing mechanism that closes the door in response to a power failure of a door drive that opens and closes the door;
- the closing control device according to claim 9 looped into an energy line between an energy supply of the door control device and the door control device; and
- wherein the closing control device buffers electrical energy from the energy supply during the normal operation of the door by the door drive.

13. An elevator system comprising an elevator car having at least one door according to claim 12.

14. A closing control device for controlling a closing movement of a door of an elevator car in response to a power failure of a door drive acting on the door, the closing control device comprising:
- an energy store buffering electrical energy during a normal operation of the door by the door drive;
- control electronics that respond to a power failure of the door drive by providing the buffered energy from the energy store as backup energy to a door control device to operate the door drive and brake a closing movement of the door; and
- wherein the control electronics provide the backup energy intermittently to the door control device.

* * * * *